United States Patent [19]
Gill

[11] 3,994,374
[45] Nov. 30, 1976

[54] LAST RESORT EMERGENCY BRAKING SYSTEM FOR HEAVY VEHICLE

[75] Inventor: Raymond E. Gill, Clearwater, Fla.

[73] Assignee: Westinghouse Air Brake Company, Pittsburgh, Pa.

[22] Filed: July 23, 1975

[21] Appl. No.: 598,341

[52] U.S. Cl. .............................. 192/4 A; 192/87.13; 74/411.5; 188/265
[51] Int. Cl.² .................................... B60K 29/02
[58] Field of Search ............ 192/4 A, 87.13, 87.18, 192/87.19, 3.26, 3.27; 74/411.5

[56] References Cited
UNITED STATES PATENTS

| | | | |
|---|---|---|---|
| 2,929,478 | 3/1960 | Tuck et al. ................... | 192/87.13 X |
| 3,038,574 | 6/1962 | Roche ................... | 192/4 A |
| 3,163,270 | 12/1964 | Zingsheim ................... | 192/3.27 |
| 3,651,904 | 3/1972 | Snog et al. ................... | 192/4 A |

Primary Examiner—Benjamin W. Wyche
Attorney, Agent, or Firm—Leydig, Voit, Osann, Mayer & Holt, Ltd.

[57] ABSTRACT

An emergency braking system for a vehicle having a transmission of the type having a plurality of selectively pressurized control ports for operating respective clutches for engaging the drive gears in predetermined combinations to provide respective driving ratios. An auxiliary pump of the positive displacement type is driven by one of the vehicle wheels to produce a source of emergency pressure fluid which is available as long as the vehicle is in motion. Emergency valve means are provided for connecting the output of the auxiliary pump simultaneously to a plurality of the control ports on the transmission which tends to connect the gears in contradictory combinations thereby to block the transmission against rotation to provide emergency braking for the vehicle wheels which are connected to the transmission. The auxiliary pump is bridged by pairs of check valves connected face-to-face and back-to-back so that pressurized fluid is available at the output regardless of whether the vehicle is moving forwardly or backing up. The emergency valve means is in the form of an override valve having a set of normal inlet ports connected to the respective control lines and outlet ports connected to the respective control ports of the transmission. The override valve has an emergency inlet port and a plunger responsive thereto which acts to connect the emergency inlet port overridingly to the control ports of the transmission when pressurized fluid is applied from the auxiliary pump.

11 Claims, 1 Drawing Figure

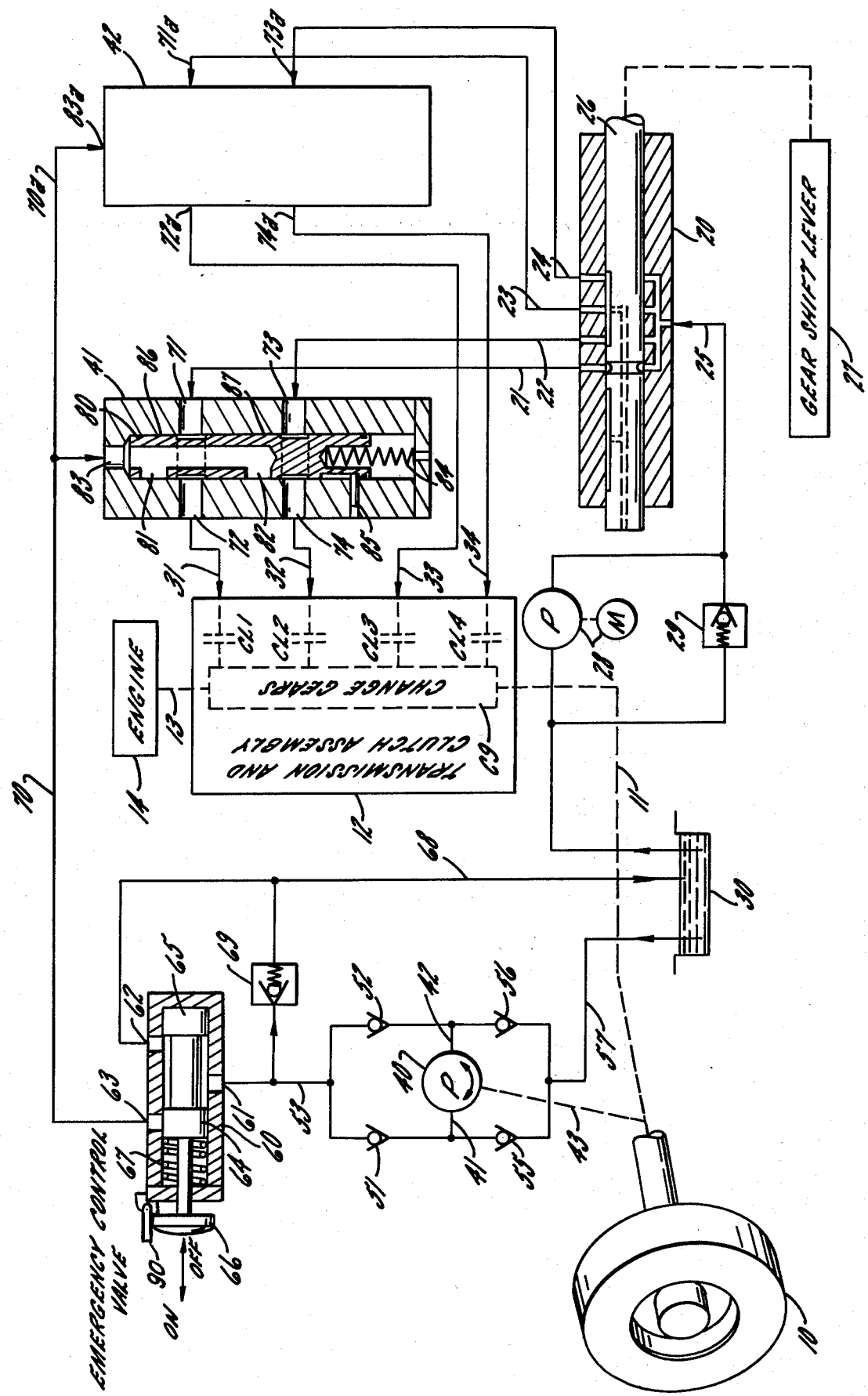

LAST RESORT EMERGENCY BRAKING SYSTEM FOR HEAVY VEHICLE

To meet safety regulations, vehicles of a size sufficient to require full power controls for steering and brakes are usually equipped with a backup source of pressurized hydraulic fluid. Such backup source is normally in the form of an auxiliary hydraulic pump driven by an electric motor receiving power from the vehicle battery so that the vehicle may be steered and stopped under emergency conditions where the main engine or regular hydraulic pump has failed.

Such systems not only assume that the battery will have sufficient stored power to operate long enough to bring the vehicle to a stop but also assume that any failure will be correctable by having available an auxiliary source of pressurized fluid. However, such systems are not capable of stopping the vehicle when failure occurs by reason of inability to utilize the pressurized fluid as, for example, when the brake lines are ruptured preventing the brake cylinders at the individual wheels from being pressurized.

It is, accordingly, an object of the present invention to provide a true emergency braking system for a vehicle which is capable of stopping the vehicle when all else fails, when there is no power whatsoever aboard the vehicle or when there has been a catastropic failure of the pressure utilization elements, for example, rupture of the regular hydraulic brake lines.

It is a more specific object of the present invention to provide an emergency braking system which is completely independent of the normal hydraulic braking system and which utilizes the fact that a hydraulically controlled transmission, having respective inlet ports for causing the gears to be engaged in predetermined combinations, is capable of "locking up" when pressurized fluid is applied simultaneously to several of the control ports tending to connect the gears of the transmission in contradictory combinations.

It is another object of the present invention to provide an emergency braking system which involves connecting the gears of the transmission simultaneously into contradictory combinations but in which the application of emergency pressurized fluid to the regular vehicle transmission is done in such a way as to avoid damaging the transmission or other element of the drive train. Specifically, means are provided for applying the emergency pressurized fluid on a gradual basis so that the locking up occurs progressively and harmlessly rather than with dangerous suddenness, utilizing the progressive clutching action of the clutches which are included as actuator elements in the usual hydraulically controlled speed change transmission.

The present invention involves a combination of two functions: The first is the creation of the source of emergency pressurized fluid solely as a result of wheel rotation which is accomplished by means of a hydraulic pump of the positive displacement type directly coupled to one of the vehicle wheels and bridged by check valves arranged face-to-face and back-to-back so that pressurized fluid is produced on an emergency basis regardless of whether the vehicle is coasting in the forward or backward direction. Secondly, for utilizing the emergency fluid, an override valve is interposed in the transmission control lines. Such valve has a plunger which is biased into a normal position in which the selector valve provides its normal gear shifting function. However, the override valve has an emergency input connection, to which the plunger is responsive, and which serves under emergency conditions to shift the plunger progressively to an alternate position in which the emergency fluid is applied simultaneously and directly to the control ports of the transmission to actuate clutches in the transmission for the setting up of contradictory gear ratios thus bringing about a condition of lockup in which the transmission, and more particularly the clutches in the transmission, perform a braking function. The emergency fluid is applied to the override valve, from the auxiliary pump, via an emergency control valve progressively operated by a manual plunger.

Other objects and advantages of the invention will become apparent upon reading the attached detailed description and upon reference to the drawing which shows, in schematic form, elements of a normal vehicle drive train and the superimposed emergency braking system constructed in accordance with the present invention.

DETAILED DESCRIPTION OF THE PREFERRED EMBODIMENT

Referring now to the drawing, there is shown a drive wheel 10 of a vehicle having a driving connection 11 to a transmission and clutch assembly 12. The transmission is coupled through a connection 13 to the vehicle engine 14.

The transmission 12 is of the hydraulically controlled type commonly employed in trucks and other heavy vehicles, having control ports leading to separate clutches CL1–CL4 to which pressurized fluid is selectively applied and which act separately to set up the change gears CG in predetermined combinations to provide respective driving ratios. Examples of such transmissions include the Clark 28000 Series transmission manufactured by Clark Equipment Co. of Buchanan, Michigan (U.S. Pat. Nos. 2,822,706 and 3,078,736) and the Funck Model 1000 Shift manufactured by Funck Mfg. Co. of Coffeeville, Kansas.

For selectively pressurizing the control ports, a venting type selector valve 20 is provided having outlet connections 21–24, an inlet connection 25 and a plunger 26 operated by gear shift lever or equivalent 27. The plunger, as illustrated, is shown in the position in which pressurized fluid is fed from the inlet connection 25 to the first outlet connection 21. Pressurized fluid is normally supplied to the inlet connection 25 from a motor driven hydraulic pump 28, the pump being protected by a relief valve 29 and having its inlet connected to a reservoir 30. The outlet connections on the selector valve are respectively connected to control lines 31–34 leading to the control ports of the transmission. However, interposed in the control lines are override valves 41, 42 which are used to override the normal shift function to provide automatic braking as will be discussed.

Attention may first be given to the means for providing emergency pressurized fluid which is utilized for both emergency control and for effecting lock-up of the transmission 12. Such fluid is furnished by an auxiliary pump 40 of the positive displacement type having connections 41, 42 and which is rotationally coupled by means of a mechanical connection 43 to the wheel 10. A gear pump is a typical pump of the positive displacement type, such pump producing pressurized fluid at one or the other of its connections depending upon direction of rotation.

However, in carrying out the present invention it is desired to produce pressurized fluid at the outlet regardless of direction of rotation. To accomplish this, the pump is bridged by a pair of check valves arranged face-to-face to define an outlet connection and by a second pair of check valves arranged back-to-back to provide an inlet connection. The first pair of check valves indicated at 51, 52, and faced as shown, define an outlet connection 53. A second pair of check valves 55, 56 define an inlet connection 57 which receives fluid from the reservoir 30.

Interposed in the flow of outlet fluid from the pump is an emergency control valve 60 having an inlet 61 and alternative outlets 62, 63. Slidable in the valve is a spool having lands 64, 65. The spool is connected to a manual plunger 66 which may be biased by spring 67 to a normal, non-emergency, position. In such position fluid entering at inlet 61 is bypassed idly through the valve, flowing from outlet port 62 through a return line 68 to the sump 30.

However, when the manual plunger 66 is pulled outwardly the emergency outlet 63 is progressively uncovered by land 64 while the bypass outlet 62 is covered by land 65 so that fluid is directed into emergency line 70 which leads to the override valves 41, 42. Excess fluid is shunted to the sump or reservoir by a relief valve 69.

Taking the override valve 41 as typical, it includes aligned entry-exit ports 71, 72 and 73, 74 through which fluid normally flows, under non-emergency conditions, for control of the transmission and clutch assembly 12 by the selector valve 20. Slidable within the valve body is a plunger in the form of a hollow spool 80 having ports 81, 82 and to which pressure fluid is applied through an emergency inlet connection 83. The valve plunger is biased into the illustrated upper position by means of a return spring 84, with the range of movement being limited by a fixed stop 85.

As a result, when pressurized fluid originating in the auxiliary pump 40 and fed through the line 70 is applied to the input connection 83, the reaction pressure forces the valve plunger 80 downwardly against the force of the return spring 84. This moves land surfaces on the plunger, indicated at 86, 87 into a position to block the normal inlet ports 71, 73, isolating the ports from the selector valve, and then moving the plunger ports 81, 82 into communication with the outlet ports 72, 74 leading to the transmission. This applies pressure simultaneously to clutches CL1 and CL2 engaging the change gears CG in contradictory combinations, thereby locking the output shaft of the transmission to stop rotation of the wheel 10 to which the transmission is connected.

The operation has been described in connection with override valve 41, but it will be understood that the override valve 42 is constructed and operates in an identical way, corresponding numerals being affixed to corresponding parts of the device with addition of subscript *a*. In short, when pressurized fluid is applied through the emergency line 70, it flows also through line 70a and to the emergency inlet connection 83a, with the resultant movement of the valve plunger therein serving to cut off normal inlet ports 71a, 73a so that emergency pressurized fluid flows out of the outlet ports 72a, 74a for simultaneous operation of clutches CL3, CL4. Thus the clutching areas of all four of the clutches in the transmission are available for braking purposes.

It is one of the features of the present construction that emergency braking may be brought about safely and gradually without abrupt blockage of the drive train which, in the case of heavily loaded truck, could readily twist off a drive shaft or cause severe damage and disablement of the transmission. If the effect of applying the emergency brake were to stop the vehicle so suddenly as to shear a driving element, the purpose of the emergency braking system would be defeated. Thus a certain amount of modulation is built into the illustrated system. As the manual plunger 66, in an emergency condition, is drawn outwardly against the restoring force of spring 67, the port 63 is only gradually uncovered and the bypass port 62 only gradually covered. Thus, as the plunger begins to move there is maximum throttling at port 63 and minimum back pressure is developed at port 62, both of these effects causing the pressure in emergency line 70 to build up from a low value. The spring 84 in the override valve is sufficiently soft so that the valve plunger will move to its shifted position while the pressure in the emergency line is still relatively low so that the pressure applied to the clutches CL1–CL4 starts from a low level, building up at a rate which depends upon the speed with which the manual plunger 66 is pulled.

As a result of all of the above, the operator has effective control of the pressure which is applied at the clutches so that these clutches are engaged simultaneously, but with controlled progressive action, so that lock-up of the transmission, also, occurs on a progressive basis, with the energy of momentum being dissipated at the faces of the clutches in the transmission until the vehicle is brough to a safe and controlled stop.

Of course where it is known that the drive train can withstand the peak forces which might be encountered in a more abrupt stop, the driver can simply be instructed that the emergency control plunger may be pulled as rapidly as desired.

It will be apparent that the system is dependent neither upon the normal sources of pressurized fluid, nor dependent upon the operativeness of the responsive portion of the normal braking system. Indeed, even though the normal hydraulic braking lines may be ruptured and the brakes completely ineffective, the present system is capable of taking over the braking function as a last resort measure utilizing the energy of the moving vehicle to bring the vehicle to a safe stop.

Nor does the success of the system depend upon the speed at which the vehicle is rolling. Regardless of speed and rate of flow from the auxiliary pump 40, excess fluid is simply bypassed through the relief valve 69 back to the sump to establish an upper pressure limit for the system. Conversely where the vehicle is barely moving, the fact that the auxiliary pump 40 is of the positive displacement type insures that when the control plunger 66 is pulled all of the way out adequate pressure will be built up in the emergency line 70 to fully operate the override valve and to fully and simultaneously pressurize the transmission clutches. This action occurs even though the vehicle may be rolling down a grade in the reverse direction. When the vehicle reaches a complete stop the pump will cease to operate, making it possible, depending on the tightness of the system, that the locked up condition may be relieved, permitting motion to resume. However, as a practical matter, an equilibrium condition will in any event be reached at such a low crawling speed that all danger to the vehicle and its operators is removed and the vehicle may be brought to a dead stop by curbing or blocking the wheels.

While it is one of the features of the present invention to provide means for enabling progressive application of the emergency brake, where desired, under manual control, it will be apparent that the invention is not limited to this, and the application may be abrupt where it is determined, as a matter of design capability, that skidding of the wheels will occur prior to damage to a drive shaft or the like in the braking train. Thus where it is known that a vehicle is capable of surviving abrupt blockage of the braking train under substantially all ground surface conditions, the operator of the vehicle can simply be instructed to pull out the plunger 66 as rapidly as possible to stop the vehicle aggressively and without attempting to exercise any judgment or skill in operation of the control.

It will also be understood that using available types of hydraulically controlled transmissions, gradual application of control pressure is to some extent inherent. Thus it will be understood that in the normal operation of such a transmission, a certain volume of fluid must flow into a port just to bring the clutch faces together, following which incremental flow produces a build-up of clutching force. Where, in the practice of the invention, there are four control ports to which the fluid is simultaneously applied, four times as much fluid must flow before full clutching action occurs. Moreover, because of slight differences between the clutches in the transmission, the clutches will not engage simultaneously to the same extent, so that actuation of the clutches tends to take place in sequence rather than simultaneously. In short, in such a system, the braking tends to occur without shock even though the emergency control valve may be forcibly jerked into braking position. This is particularly true where an auxiliary pump is chosen having a relatively low volumetric rate.

As a further step toward elimination of the "skill factor", the operating plunger 66 may be provided with a dashpot to limit its rate of movement.

It is conceivable that an emergency braking situation may arise at the same time that the operator must leave the cab because of fire in the cab or for similar reasons. To take care of this contingency, I provide means for "setting" the emergency brake automatically at the end of the stroke of the brake control plunger. Such setting means may, for example, be in the form of a biased latch 90 (see drawing) cooperating with the plunger 66 and dimensioned to drop behind the knob of the plunger after the plunger has been manually pulled to its extended position. It is preferred to employ a latch at the operating position because of ease in resetting, but it will be understood that it is not essential for the latch to be in the position shown, and latching may be employed elsewhere in the system, provided that its effect is to maintain the clutches CL1–CL4 pressurized even after the operator lets go of the knob of the emergency control valve.

One of the advantages of the illustrated system is that any positive displacement pump 40 may be utilized by the simple addition of check valves face-to-face and back-to-back. It will, however, be understood that it is not necessary to use a pump of conventional type and special positive displacement pumps are available on the market capable of producing pressure at an outlet independently of the direction of rotation of the shaft.

With regard to the mounting of the pump 40, the specific mounting means is entirely optional, and all that is required is that the pump be directly coupled to a vehicle wheel to rotate as long as such wheel is rotating. The pump may, for example, be coupled to the bevel pinion shaft of the vehicle. The term "vehicle wheel" for present purposes is not limited to one of the normal vehicle supporting wheels, and the wheel can be any wheel, even an auxiliary wheel, which contacts the ground and rotates in response to vehicle movement.

I claim as my invention:

1. In a vehicle having driving wheels and an engine, the combination comprising a transmission having a set of selectable speed change gears interposed between the engine and the drive wheels, the transmission having means including a plurality of control ports effective upon selective pressurization to engage the gears of the set in predetermined combinations to provide respective driving ratios, normally operable means for selectively pressurizing the ports, such pressurizing means including a selector valve having a normal source of pressurized fluid and control lines connected to the respective ports, an auxiliary pump of the positive displacement type having a reservoir of fluid and drivingly coupled to one of the wheels of the vehicle to produce pressurized fluid at its outlet as long as the vehicle is in motion, an emergency control valve having an inlet port connected to the outlet of the pump and an outlet port, an override valve having a set of outlet ports connected to the control lines, the override valve having an emergency inlet port connected to the outlet port of the emergency control valve so that when the emergency control valve is operated the emergency inlet port is connected to the control ports of the transmission tending to connect the gears thereof into contradictory combinations for locking of the transmission against rotation to provide emergency braking for the drive wheels.

2. In a vehicle having driving wheels and an engine, the combination comprising a transmission having a set of selectable speed change gears interposed between the engine and the drive wheels, the transmission having means including a plurality of control ports effective upon selective pressurization to engage the gears of the set in predetermined combinations to provide respective driving ratios, normally operable means for selectively pressurizing the ports, such pressurizing means including a selector valve having a normal source of pressurized fluid and control lines connected to the respective ports, an auxiliary pump of the positive displacement type having a reservoir of fluid and drivingly coupled to one of the wheels of the vehicle to produce pressurized fluid at its outlet as long as the vehicle is in motion, and emergency valve means for connecting the outlet of the auxiliary pump simultaneously to a plurality of the control ports of the transmission tending to connect the gears thereof into contradictory combinations thereby to lock the transmission against rotation to provide emergency braking for the drive wheels.

3. The combination as claimed in claim 2 in which the emergency valve means includes manually controlled means for applying pressure on a gradually increasing basis to the control ports of the transmission for gradual engagement of the clutches therein to produce gradual lockup of the transmission and progressive braking of the drive wheels thereby to insure against rise of decelerational forces to a destructive level.

4. The combination as claimed in claim 2 in which the pump is so constructed and arranged as to produce pressurized fluid at its output regardless of the direction of rotation of the vehicle wheels.

5. The combination as claimed in claim 2 in which the pump is bridged by a first set of check valves connected face to face to provide an outlet connection and bridged by a second pair of check valves connected back to back to define an inlet connection so that pressurized fluid is produced at the outlet connection regardless of the direction of rotation of the pump so that emergency braking is available regardless of whether the vehicle is proceeding forwardly or backing up.

6. The combination as claimed in claim 2 in which the emergency valve means includes an override valve having a set of normal inlet ports connected to the respective lines and having a set of outlet ports connected to the control ports of the transmission, the override valve having an emergency inlet port coupled to the outlet of the auxiliary pump, said override valve including a plunger (a) for interconnecting the inlet and outlet ports for normal selective control of the transmission and, upon movement of the plunger, (b) for connecting the emergency inlet port simultaneously to the valve outlet ports for simultaneously pressurizing a plurality of the control ports on the transmission.

7. The combination as claimed in claim 2 in which an override valve is provided having a set of normal inlet ports connected to the respective lines and having a set of outlet ports connected to the control ports of the transmission, the override valve having an emergency inlet port coupled to the outlet of the auxiliary pump, said override valve including a plunger for interconnecting the inlet and outlet ports for normal selective control of the transmission and movable into an alternate position, the plunger being exposed to the emergency inlet port for movement into its alternate position when pressurized fluid is applied to such port for conducting the pressurized fluid simultaneously to the outlet ports, and means including a manually operable emergency valve interposed between the override valve and the auxiliary pump for normally diverting fluid from the auxiliary pump to the reservoir but manually operable under emergency conditions to direct the output of the pump to the emergency inlet port of the override valve for simultaneously pressurizing a plurality of the control ports on the transmission.

8. In a vehicle having driving wheels and an engine, the combination comprising a transmission having a set of selectable speed change gears interposed between the engine and the drive wheels, the transmission having means including a plurality of control ports effective upon selective pressurization to engage the gears of the set in predetermined combinations to provide respective driving ratios, normally operable means for selectively pressurizing the ports, such pressurizing means including a selector valve having a normal source of pressurized fluid and control lines connected to the respective ports, an auxiliary pump of the positive displacement type having a reservoir of fluid and drivingly coupled to one of the wheels of the vehicle to produce pressurized fluid at its outlet as long as the vehicle is in motion, and emergency valve means including means for (a) isolating the control lines from the selector valve and (b) connecting the outlet of the auxiliary pump simultaneously to the control lines to pressurize the control ports of the transmission tending to connect the gears thereof into contradictory combinations thereby to lock the transmission against rotation to provide emergency braking for the drive wheels.

9. In a vehicle having driving wheels and an engine, the combination comprising a transmission having a set of selectable speed change gears interposed between the engine and the drive wheels, the transmission having means including a plurality of control ports effective upon selective pressurization to engage the gears of the set in predetermined combinations to provide respective driving ratios, normally operable means for selectively pressurizing the ports, such pressurizing means including a gear selector valve having a normal source of pressurized fluid and control lines connected to the respective ports, an auxiliary pump of the positive displacement type having a reservoir of fluid and drivingly coupled to one of the wheels of the vehicle to produce pressurized fluid at its outlet as long as the vehicle is in motion, an emergency control valve having an inlet port, a bypass port and an outlet port, with the inlet port being connected to the outlet of the pump and the bypass port being connected to the reservoir, the emergency control valve being so constructed that fluid from the pump is normally bypassed to the reservoir and so that upon progressive manual actuation pressure is progressively built up at the outlet port, an override valve having a set of normally communicative inlet and outlet ports interposed in the control lines to permit normal operation of the selector valve, the override valve having an emergency inlet port connected to the outlet port of the emergency control valve, the override valve having a plunger and return spring therefor so that when pressure fluid is progressively applied at the emergency inlet port the plunger moves progressively to an alternate position, the override valve including ports opened in the alternate position for connecting the emergency inlet port to the control ports of the transmission tending to connect the gears thereof into contradictory combinations for progressive locking of the transmission against rotation to provide emergency braking for the drive wheels.

10. In a vehicle having driving wheels and an engine, the combination comprising a transmission having a set of selectable speed change gears interposed between the engine and the drive wheels, the transmission having means including a plurality of control ports effective upon selective pressurization to engage the gears of the set in predetermined combinations to provide respective driving ratios, normally operable means for selectively pressurizing the ports, such pressurizing means including a gear selector valve having a normal source of pressurized fluid and control lines connected to the respective ports, an auxiliary pump of the positive displacement type having a reservoir of fluid and drivingly coupled to one of the wheels of the vehicle to produce pressurized fluid at its outlet as long as the vehicle is in motion, an emergency control valve having an inlet port, a bypass port and an outlet port, with the inlet port being connected to the outlet of the pump and the bypass port being connected to the reservoir, the emergency control valve being so constructed that fluid from the pump is normally bypassed to the reservoir and so that when the valve is manually actuated the inlet and outlet ports are connected together and the bypass port is shut off, an override valve having a normally communicative set of inlet and outlet ports interposed in the control lines to permit normal operation of the selector valve, the override valve having an emergency inlet port connected to the outlet port of the emergency control valve, the override valve having a plunger and return spring therefor and so constructed that when pressure fluid is applied at the emergency inlet port the plunger moves to an alternate position, the override valve including ports opened in the alternate position for connecting the emergency inlet port to the control ports of the transmission tending to connect the gears thereof into contradictory combinations for locking of the transmission against rotation to provide emergency braking for the drive wheels, and a relief valve connected to the outlet of the pump for limiting the pressure developed by the pump when the bypass port of the emergency control valve is shut off.

11. The combination as claimed in claim 2 in which the emergency valve means includes a manual operator and in which means are provided for latching the emergency valve means in braking condition following manual actuation for sustained braking action after the operator leaves his operating position.

* * * * *